United States Patent
Nguyen et al.

(10) Patent No.: US 8,798,678 B2
(45) Date of Patent: Aug. 5, 2014

(54) SYSTEMS AND METHODS FOR CONTROLLING QUALITY OF SERVICE AT PICOCELLS USING AGNOSTIC PLATFORM

(75) Inventors: Quang Nguyen, Milpitas, CA (US); Henry Shi, Milpitas, CA (US); Robert Nino, Milpitas, CA (US); Robert Reagan, Milpitas, CA (US)

(73) Assignee: Public Wireless, Inc., San Jose, CA (US)

( * ) Notice: Subject to any disclaimer, the term of this patent is extended or adjusted under 35 U.S.C. 154(b) by 14 days.

(21) Appl. No.: 13/224,054

(22) Filed: Sep. 1, 2011

(65) Prior Publication Data

US 2012/0058777 A1     Mar. 8, 2012

Related U.S. Application Data

(60) Provisional application No. 61/379,678, filed on Sep. 2, 2010.

(51) Int. Cl.
    *H04B 17/00*      (2006.01)

(52) U.S. Cl.
    USPC ........ 455/561; 455/423; 455/67.11; 370/396; 370/329; 370/241.1

(58) Field of Classification Search
None
See application file for complete search history.

(56) References Cited

U.S. PATENT DOCUMENTS

| | | | | |
|---|---|---|---|---|
| 5,395,042 | A  * | 3/1995  | Riley et al. | 236/46 R |
| 7,191,355 | B1 * | 3/2007  | Ouellette et al. | 713/400 |
| 2005/0287980 | A1* | 12/2005 | Wood | 455/404.1 |
| 2008/0285633 | A1* | 11/2008 | Rofougaran | 375/219 |
| 2009/0029645 | A1* | 1/2009  | Leroudier | 455/7 |
| 2009/0257387 | A1* | 10/2009 | Gholmieh et al. | 370/329 |
| 2010/0054223 | A1* | 3/2010  | Zhang et al. | 370/338 |
| 2010/0111052 | A1* | 5/2010  | Erceg et al. | 370/338 |
| 2010/0216407 | A1* | 8/2010  | Gormley | 455/67.11 |
| 2010/0234694 | A1* | 9/2010  | Takano et al. | 600/300 |

* cited by examiner

*Primary Examiner* — Rafael Pérez-Gutiérrez
*Assistant Examiner* — Keith Fang
(74) *Attorney, Agent, or Firm* — Procopio, Cory, Hargreaves & Savitch LLP

(57) ABSTRACT

Systems and methods for maintaining the quality of service provided by a picocell and for reducing the cost to maintain and operate the picocell. The systems and methods provided herein, in an embodiment, provide for a backhaul and radio agnostic system where the picocell is highly configurable and can be used with a variety of different types of backhauls and radio devices. Remote monitoring and configuration of the device may be provided to reduce the cost of maintaining the picocell.

13 Claims, 6 Drawing Sheets

SYSTEMS AND METHODS FOR CONTROLLING QUALITY OF SERVICE AT PICOCELLS USING AGNOSTIC PLATFORM

PRIORITY CLAIM

This application claims priority to U.S. Provisional Patent App. No. 61/379,678, filed on Sep. 2, 2010, titled "Systems And Methods for Controlling Quality of Service at Picocells Using Agnostic Platform," the entirety of which is hereby incorporated herein by reference.

FIELD OF THE INVENTION

The present invention generally relates to the field of wireless communication systems and more specifically to systems and methods for controlling quality of service at a picocell.

SUMMARY

In one embodiment, a remotely configurable base station is provided. The base station comprises a plurality of external radio devices, each of the plurality of external radio devices configured to establish a wireless link between the base station and one or more user devices using any one of a plurality of frequencies and any one of a plurality of communication protocols. The base station may further comprise one or more sensors configured to capture environmental information, and a heating/cooling system configured to maintain at least one of a temperature and humidity of the base station. The base station may also comprise a GPS antenna. In an embodiment, the base station comprises a backhaul module configured to connect to a network using any one of a plurality of backhaul connections. The base station may further comprise a common controller module, comprising a processor, and configured to direct data between the one or more external radio devices and the network using the backhaul module, receive the environmental information from the one or more sensors, control the heating/cooling system based on the environmental information, receive location information from the GPS antenna, send the location information to the remote network operations center, individually activate and deactivate each of the plurality of external radio devices, receive configuration information from a remote network operations center, and, based on the configuration information, individually configure each of the plurality of external radio devices to use any one of the plurality of frequencies and any one of the plurality of communication protocols.

In another embodiment, a remotely-configurable base station is provided. The base station may comprise one or more external radio devices, each of the one or more external radio devices configured to establish a wireless link between the base station and one or more user devices using any one of a plurality of frequencies and any one of a plurality of communication protocols. The base station may further comprise at least one memory, at least one processor, and at least one executable software module stored on the at least one memory. The at least one executable software module may be configured, when executed by the at least one processor, to connect to a network using any of a plurality of connection types, transmit data between the one or more external radio devices and the network, receive configuration information from a remote network operations center, and, based on the configuration information, reconfigure one or more of the one or more external radio devices to use at least one of a different one of the plurality of frequencies or a different one of the plurality of communication protocols than it was using prior to the reconfiguration.

In a further embodiment, a method of remotely configuring a picocell is provided. The picocell may comprise a plurality of external radio devices, each of the plurality of external radio devices configured to establish a wireless link between the picocell and one or more user devices. The method comprises, by the picocell, transmitting data between one or more of the plurality of external radio devices and a network; receiving configuration information from a remote network operations center; and, based on the configuration information, configuring at least one of the plurality of external radio devices to use at least one of a different frequency or a different communication protocol than it was using prior to the configuration.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain implementations as disclosed herein include systems and methods for maintaining the quality of service provided by a base station, for example, a picocell, and for reducing the cost to maintain and operate the base station are described herein. The systems and methods provide for a backhaul and radio agnostic system where the picocell is highly configurable and can be used with a variety of different types of backhauls and radio devices. Remote monitoring and configuration of the device can be provided to help reduce the cost of maintaining the picocell. While the embodiments described herein are directed to picocells, the systems and methods described herein can also be applied to femtocells.

Figure 1:
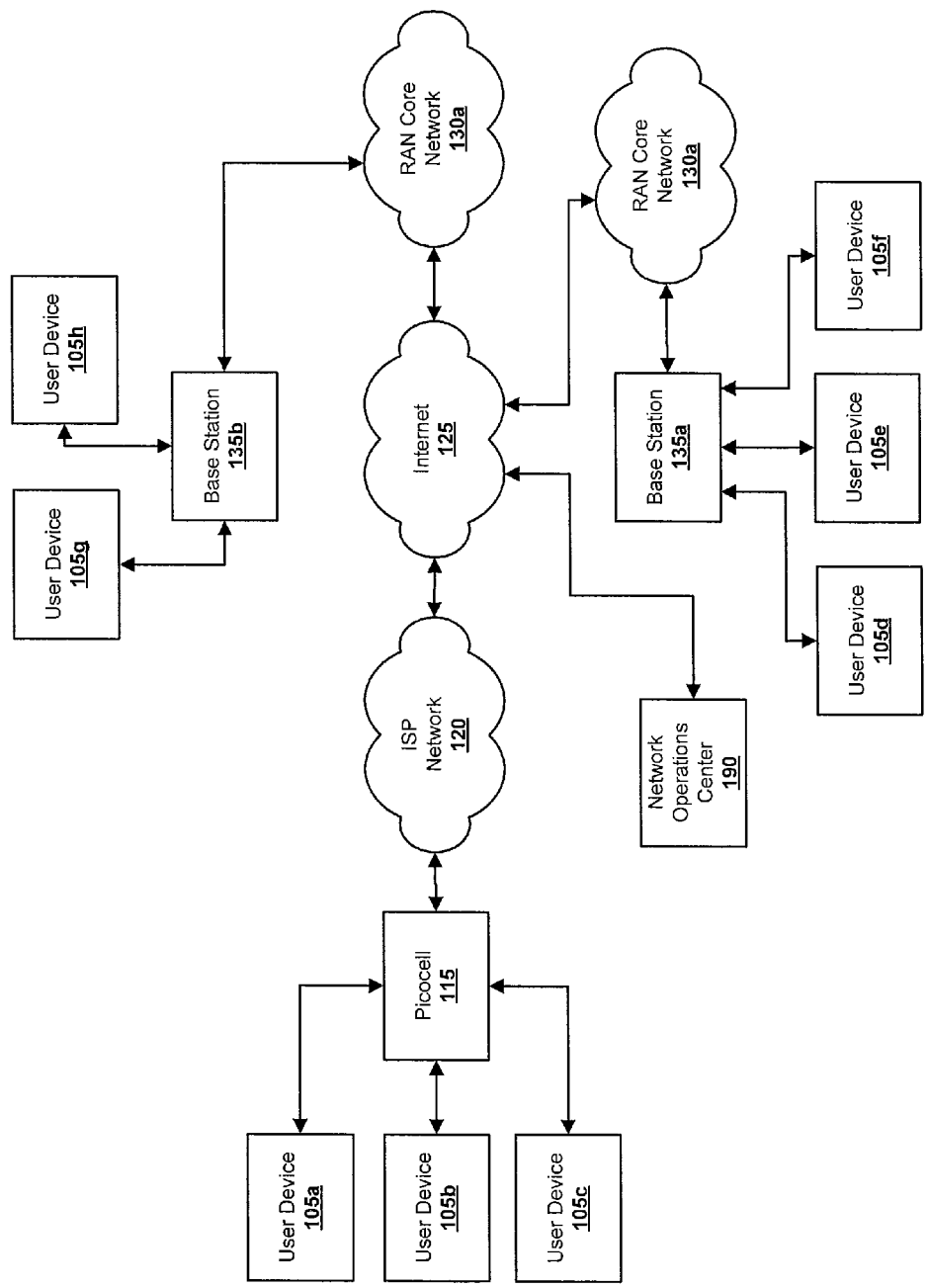
FIG. 1 is a functional block diagram of an example of a typical picocell deployed in a wireless communications network in which the system and methods disclosed herein can be implemented according to an embodiment.

FIG. 1 illustrates an example of a typical picocell deployed in a wireless communications network. Picocell 115 is a small base station that can be deployed to provide coverage for a smaller area than a typical base station. For example, picocell 115 could provide coverage for an office building, hotel, condominium complex, shopping mall, airports, train station, event venue, etc. Picocells can be used to fill in coverage in indoor environments where signals from outdoor conventional base stations do not easily reach. Picocells can also be used to add network capacity in areas where dense mobile device usage can be present, such as airports, train stations, and sports or concert venues.

Picocell 115 can be configured to provide coverage for one or more mobile phone carriers/network providers. Picocell 115 can be configured to communicate with the radio access network (RAN) core networks 130 of the mobile phone carriers via a broadband connection provided by an Internet Service Provider (ISP) network 120. The ISP network 120 provides a backhaul connection for the picocell (or femtocell) 115. The ISP network 120 may communicate with the core networks 130 directly or indirectly via the Internet 125. Core networks 130 provide telecom services to the user devices 105 that are subscribers of the respective network provider associated with the core network 130. User devices 105 can be a mobile communication device, such as a mobile phone or wireless modem, or other device configured to use voice and/or data communication services of the core network 130, and other wireless network systems (e.g., WiMax).

Picocell 115 can receive the data from the core network 130 via the ISP network 120 and transmit the data to the one or more user devices 105. Picocell 115 can also receive voice and/or data packets from the user devices 105.

As described above, picocell 115 can be contracted with one or more mobile network providers to provide coverage for user devices 105 associated with those carriers. At least some of the user devices 105 that enter the coverage area of the picocell 115 can be associated with other carriers. These user devices 105 may be configured to communicate using a different frequency than the picocell 115 is configured to use when communicating with those user devices 105 associated with the carriers with which the picocell 115 is contracted to provide coverage.

The coverage area of picocell 115 can also overlap the coverage areas of one or more base stations 135. The base stations 135 are in communication with the RAN core network 130 and provide coverage to user devices 105. FIG. 1 has been simplified for ease of explanation and could include a plurality of picocells 115.

According to an embodiment, the picocell 115 can include one or more radio devices that can be remotely configured by a network administrator to operate using different frequencies and/or communication protocols. In some embodiments, the radio devices of the picocell can be reconfigured based on demand. Furthermore, the picocell can include radio devices, beyond what is forecast for current coverage needs, to allow the picocell to expand to provide service to a larger number of subscribers and/or carriers in the future and to provide additional radio devices that can be activated in the future if internal monitoring systems implemented into the picocell detect that a radio device has failed. By providing reconfigurable radio devices and radio devices in excess of projected near term requirements, significant cost savings can be realized by reducing the number of times that a technician needs to be deployed into the field to service the picocell. Remote monitoring allows system administrators to identify problems early, and attempt to correct the problems remotely. Should an error not be correctable remotely, the systems administrators can schedule a technician to service the device and order a replacement device that can be assembled and shipped to the technician in advance. The technician then can simply replace the faulty device with the new device and ship the faulty device back to a maintenance center for refurbishment. This approach can significantly reduce the amount of time that technicians need to be deployed at the picocell site since they do not have to diagnose problems in the field. This approach can also reduce expenses by eliminating the need for the technicians to have expensive diagnostic equipment and replacement parts out in the field.

According to an alternative embodiment, picocell 115 can be configured to include a plurality of non-configurable radio devices, and an External Radio Device Support System (ERDSS) that can be configured to switch on or off the appropriate radio based on the current need. The EDRSS is further described below in relation to FIGS. 2 and 3.

Network operations center (NOC) 190 comprises one or more computing centers for managing the operation of the picocell 115 in the field. In some embodiments, the NOC 190 can manage the operation of an entire network of picocells installed across a wide geographical area. In other embodiments, the network can comprise a mix of different types of base stations, such as picocells and femtocells.

The NOC 190 allows administrators to remotely monitor the operation of picocell 115 and any other base stations on the network. According to an embodiment, a system administrator or technician can also remotely configure the picocell 115 in the event that a problem is identified that can be corrected by reconfiguring the picocell 115. If a problem is identified at the picocell 115, a system administrator can schedule a service technician to visit the picocell 115 in the field and preorder the replacement components needed to correct the problem before the technician is dispatched. In some embodiments, in order to decrease service costs and the number and length of visits to picocells deployed in the field, a replacement picocell matching the requirements of a malfunctioning picocell can be ordered and shipped to the technician in advance of the technician visiting the site, and the entire picocell can be replaced by the technician and sent back to a central service facility for refurbishment. The refurbished picocell can then be used in a future installation. This approach can result in significant cost savings, because technicians can be trained to quickly replace the entire device in the field. Technicians do not have to spend significant amounts of time trying to diagnose a malfunctioning piece of equipment in the field, and each of the technicians deployed in the field do not require expensive diagnostic equipment and an extensive supply of spare parts.

According to an embodiment, system administrators can monitor the network or networks providing backhaul connectivity to the picocell 115 and troubleshoot network problems. In the event that a problem occurs in a portion of the network managed from the NOC, a technician can be dispatched to correct the problem. In the event that a problem is detected in a portion of the network managed by a third party network provider, such as ISP network 120, the third party network provider may be contacted, and an identification of the problem and related information may be provided to the third party.

Figure 2:
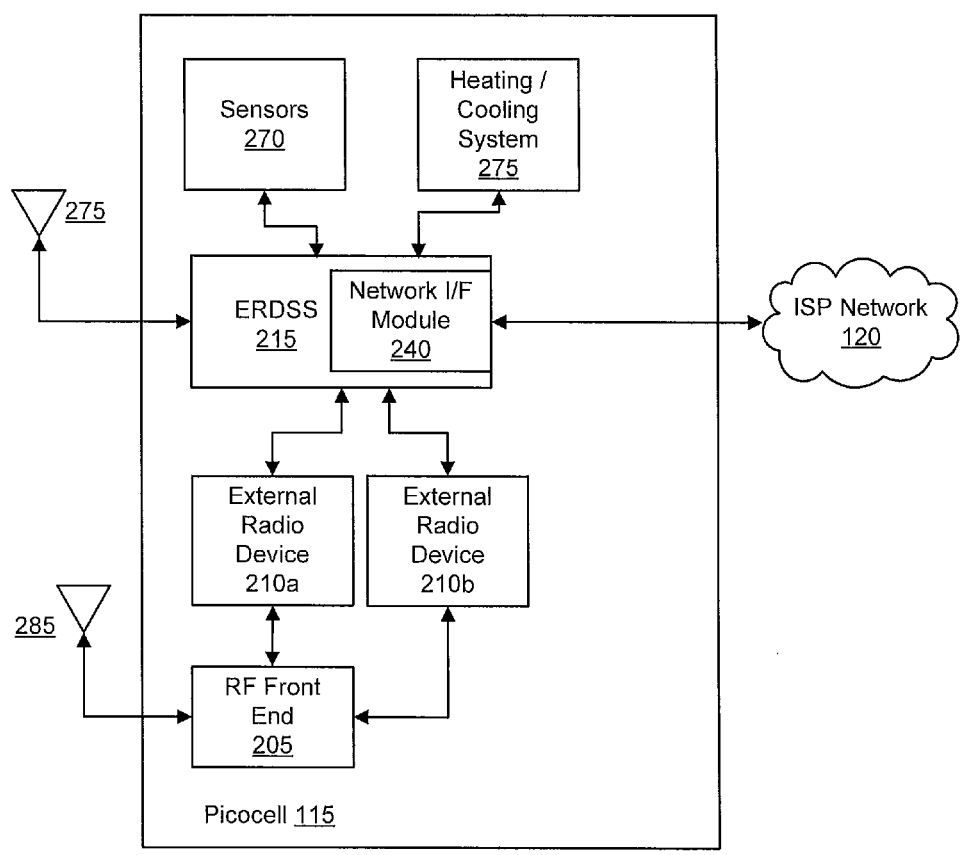
FIG. 2 is a functional block diagram of the logical components of a picocell according to an embodiment.

FIG. 2 is a block diagram of the logical or functional components of picocell 115 according to an embodiment. Picocell 115 includes RF front end module 205, external radio devices (ERDs) 210a and 210b, External Radio Device Support System (ERDSS) module 215, and network interface module 240. The picocell 115 can also include sensors 270 and heating/cooling system 275 that interface with the ERDSS 215. The function of the sensors 270 and the heating/cooling system 275 are described in further detail below in relation to FIG. 3.

According to an embodiment, the ERDs 210a and 210b can comprise software-defined radios (SDRs) for communicating wirelessly with the user devices 105. The SDR 210 can send data and/or voice packets received by the picocell 115 via the ISP network 120 to the user devices 105. The SDR can also receive voice and/or data packets from the user devices 105.

The SDR 210 is a programmable radio device that includes a processor for executing signal processing. The SDR 210 can be configured to receive and transmit using a variety of different radio protocols (waveforms) based on the software that is executed by the processor of the SDR 210. The SDR 210 can be reconfigured to change radio protocols and/or frequencies at which the SDR 210 operates in real time.

The RF front end module 215 may provide an interface between the ERDs 210a and 210b and the antenna 285. Antenna 285 can comprise one or more antenna elements. The RF front end module can comprise power amplifiers for driving the antenna 285, low noise amplifiers (LNAs) for amplifying signals captured by antenna 285, and can implement various filters for conditioning signals received from the antenna 285 and/or from the ERDs 210a and 210b.

The RF front end module can be configured to combine and split the RF signals, e.g., for embodiments where picocell 115 includes multiple antennas 285. For example, the picocell 115 can be configured for multiple-input and multiple-output (MIMO) or diversity usage. For example, in one embodiment, the ERD 210a can include two receive chains supporting diversity combining.

The one or more antennas 285 can comprise a broadband antenna that is optimized for transmitting and/or receiving in the frequency bands that are typically used for mobile communications.

Network interface module 240 is a component of the ERDSS 215 and provides an interface between a broadband connection to the ISP network 120 and the picocell 115. This connection provides a backhaul for the picocell 115. The network interface 240 can send voice and/or data packets across ISP network 120 to the RAN core networks 130, the Internet 125, and/or to other destinations connected to the ISP network 120. The network interface can also receive voice and/or data packets from the network 120. As indicated above, the picocell 115 can include multiple ERDs 210, and each ERD can be configured for use with a particular mobile carrier. In some embodiments, the ERDs can be reconfigured for use with different mobile carriers based on demand.

External Radio Device Support System (ERDSS) module 215 can be configured to provide an interface to the backhaul of picocell 115. The ERDSS module 215 can be configured to operate with various types of backhaul connections to the ISP network 120. For example, the ERDSS module 215 can be configured to operate with various types of backhaul connections, such as Data Over Cable Service Interface Specification (DOCSIS) connections, Asymmetric Digital Subscriber Line (ADSL) connections, Very-high-bit rate DSL (VDSL), Digital signal 1 (T1), or optical fiber connections. In some embodiments, the ERDSS can also use a satellite backhaul. The ERDSS can also be configured to provide power distribution and control, environmental monitoring, and local and remote system management support for the picocell. For example, in an embodiment, an administrator or technician can remotely monitor the operating status of the picocell, can send configuration commands and/or updated software to the ERDSS 215 to remotely modify the operation of the ERDSS 215 without requiring a technician to visit the picocell 115 in the field to check the status of the device, maintain the device, or reconfigure the device. According to some embodiments, the picocell 115 can include more ERDs than are needed to provide service according to the contracts with the carriers. The additional ERDs can provide failover protection in the event that an ERD fails. The ERDSS can disable the faulty ERD and configure one of the extra ERDs to take over for the faulty ERD. This can provide a significant cost savings by eliminating the need for a service technician to visit the picocell 115 to service the device. The ERDSS can send an alert message to the NOC 190 that an ERD 210 has failed and whether another ERD 210 was successfully configured to take the place of the failed ERD 210. In another embodiment, the ERDSS can configure an ERD 210 to handle excess traffic during high utilization periods if the picocell 115 includes an available ERD 210.

Figure 3:
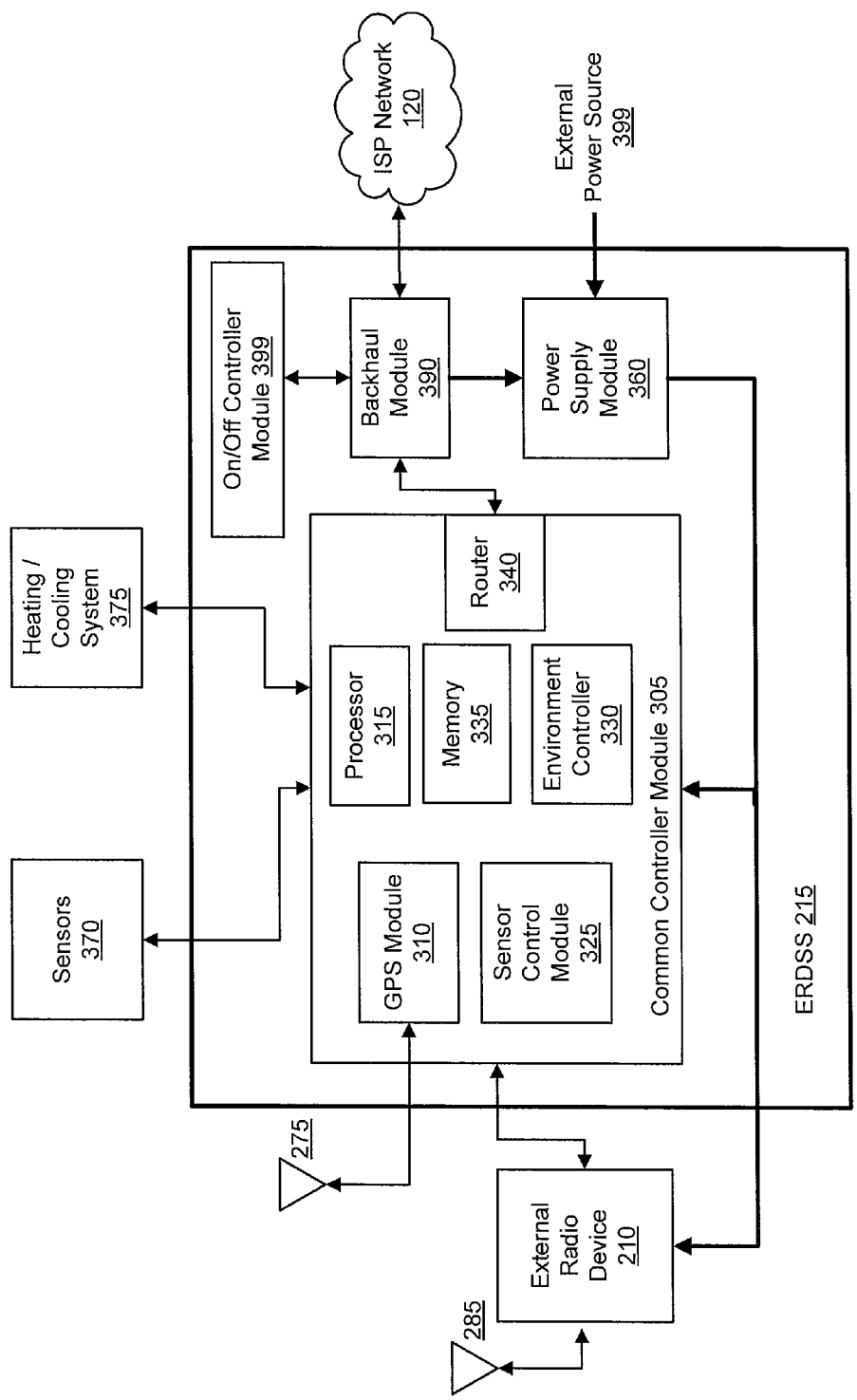
FIG. 3 is a functional block diagram of an External Radio Device Support System (ERDSS) according to an embodiment.

FIG. 3 is a block diagram of ERDSS 215 according to an embodiment. ERDSS 215 may include common control module 305, power supply module 360, and backhaul module 390. The ERDSS 215 may be connected to the ISP network 120 via the backhaul module 390. The ERDSS is also connected to ERD 210. According to an embodiment, the network interface module 240 of FIG. 2 can comprise the backhaul module 390 illustrated in FIG. 3. In an embodiment, the ERDSS 215 can also include an on/off controller module 399.

The backhaul module 390 is configured for backhauling mobile device's data received via the ERD 210 to the subscribed mobile carrier's core network 130. The backhaul module 390 is also configured to forward data from the subscribed mobile carrier's core network 130 to the ERD 210.

The backhaul module 390 can be configured to include various types of data connections to the ISP network 120. For example, some embodiments can use cable television (CATV) connection, a Data Over Cable Service Interface Specification (DOCSIS) connections, digital subscriber line (DSL) connections, Asymmetric Digital Subscriber Line (ADSL) connections, Very-high-bit rate DSL (VDSL) connections, Digital signal 1 (T1), optical fiber connections, or other types of broadband connections. In some embodiments, the ERDSS 215 can use a satellite backhaul connection. According to an embodiment, the backhaul module 390 can be configured to support backhaul fault and performance monitoring, including Carrier Ethernet grade one-way frame delay measurement, connectivity fault management and fault isolation per ITU-T Y.1731 and other Carrier grade Ethernet standards and proprietary methods.

According to an embodiment, the common controller module (CCM) 305 is responsible for managing the operation of the ERDSS 215. The common controller module 305 can be programmed to configure the various functional units of the system including the power supply module 360 and the backhaul module 390. The CCM 305 can be configured to provide for local and remote maintenance of the ERDSS 215 and can be configured to control the power supply to the ERDSS 215 via the power supply module 360. The core of the CCM 305 may be configured to be agnostic toward the type of backhaul interface used to connect the ERDSS 215 to the ISP network 120 and may be configured to be agnostic toward the type of radio interface used so as to allow the ERDSS 215 to be extremely flexible. According to some embodiments, the ERDSS 215 is modular such that one or more ERD 210 of the same or varying configuration can be plugged into the ERDSS 215. In some embodiments, the backhaul module 390 and the power supply module 360 can be modular, and an appropriate backhaul module 390 and the power supply module 360 can be plugged into the ERDSS 215 based on the type of backhaul and type of power supply to be used.

In an embodiment, the CCM 305 comprises a processor 315, a memory 335, router 340, environment controller module 330, sensor control module 325, and GPS module 310. Processor 315 can be configured to execute programmable code stored in the memory 335. Memory 335 is a tangible computer readable medium, and memory 335 can comprise persistent memory, such as flash memory, volatile memory, such as random access memory, or a combination thereof. Other types of persistent and/or volatile memory can be used.

According to an embodiment, the ERDSS 215 can be programmed remotely by updating the executable program code stored in the memory 335. In some embodiments, the code can be remotely updated from the NOC 190 via the backhaul connection to the ERDSS 215. According to an embodiment, the CCM 305 can be configured to communicate with the NOC 190 using in-band or out-of-band communications.

According to an embodiment, the CCM 305 can be configured to provide synchronization of the backhaul traffic, jitter buffering, stack jitter control, and derive precise frequency and timing from an IEEE 1588 traffic flow.

According to some embodiments, the ERDSS 215 can include a GPS module 310. The GPS module 310 may be coupled to a GPS antenna 275. The GPS module can provide location data for the ERDSS 215. In an embodiment, the ERDSS 215 can provide the location information obtained from the GPS module 310 to the NOC 190 so that technicians can remotely confirm the location of the picocell 115. For example, the location information can be used to confirm that the picocell 115 has been installed at the correct location, to confirm whether picocell 115 is still installed at the correct locations, and to facilitate a field technician in locating the picocell 115, should physical visit to the picocell be required for maintenance or upgrade. In some embodiments, the ERDSS 215 can self-configure by utilizing the GPS location and a NOC database to obtain configuration information for site-specific operating parameters, such as RF frequency, signal strength, etc. This can allow for more efficient deployment of the picocells 115. The GPS module 310 can also provide timing information to the ERDSS 215 in addition to location information. This timing information can include data and time information and can be used for wireless communication synchronization.

According to some embodiments, the picocell 115 can include a heating/cooling system (HCS) 275. The picocell 315 may be installed in harsh conditions with extremely high or low temperature and/or humidity that could adversely affect the operation of the picocell 115. The HCS 275 can be configured to provide heating/cooling to maintain the temperature of the device within a preferred operating range for the device. The HCS 275 can also be configured to dehumidify the air where humidity levels exceed preferred operating thresholds.

The picocell 115 can also include one or more sensors 270 that can collect environmental information, such as temperature and humidity levels in the picocell 115. Other types of sensors, such as an accelerometer can also be included to determine whether the picocell 115 is being subjected to vibrations or impact. For example, the accelerometer could be used to determine whether a picocell mounted on a utility pole or other outside area is being subjected to high winds. The sensor control module 325 is configured to receive and process signal data from the various sensors 270. According to an embodiment, the sensor control module 325 can be implemented in software, hardware, or a combination thereof. In some embodiments, the ERDSS 215 can provide ports or other data interfaces that allow the ERDSS 215 to interface with various types of sensors, and the sensor control module 325 can be configured to operate the various sensors interfaced with the ERDSS 215.

The environment controller module 330 can be configured to receive environmental sensor data from the sensor control module 325, to analyze the environmental signal data, and to send control signals to the HCS 275 to cause the HCS 275 to heat or cool the picocell 315 if the temperature range of the picocell 315 has risen above or fallen below a preferred operating range for the device.

The router 340 can receive packet data from the backhaul module 390 and provide packet data from the CCM 305 to the backhaul module 390 for transmission across the backhaul connection. The CCM 305 can be configured to packetize data received from the external radio device 210 to facilitate transmission of the data from the external radio device 210 across the backhaul and to reconfigure the packetize data received from across the backhaul via router 340 to a data format expected by the external radio device 210. In some embodiments, data packets from/to ERD 210 are received/sent by the router 340 and transported directly to the ISP network 120 via the backhaul module 390. In other embodiments, data packets from/to an ERD 210 are received/sent by the CCM 305 before being transported to the ISP network 120 via the backhaul module 390. Furthermore, it is also possible that both approaches are utilized simultaneously in the same picocell based on network requirements, traffic types, or other considerations. The router 340 can direct traffic from any port to any other port based on source and destination address. The router 340 can also be configured to perform "quality of service" (QoS) functions that can include classifying, queuing, prioritizing, sending or dropping packets based on service level requirements (throughput, latency, jitter, etc.). The router 340 can also be configured to assign private IP address(es) to ERDs and do public to private Internet Protocol (IP) address translation to simplify interface with backhaul ISP. For example, only one public IP address would be needed for whole picocell 115 regardless of number of ERDs 210. According to some embodiments, the router 340 can be configured to operate in a transparent switch mode where each ERD 210 can be assigned a separate network address. The router 340 can also be configured to perform deep traffic inspection and processing, such as splitting voice and data into separate data streams and performing traffic optimization.

The external radio device 210 is responsible for establishing a wireless link between the picocell 115 and one or more user devices 105. According to an embodiment, the ERD 210 receives data to be transmitted to the user device 105 via the ERDSS 215.

In an embodiment, the ERDSS 215 can be configured to interface with a plurality of ERDs 210, and the number of ERDs 210 that are included in the picocell 115 can vary depending upon the implementation. The ERDSS 215 can be configured to facilitate data being received from a plurality of the ERDs 210, packetize the data, and send the data across the backhaul to one or more RAN core networks 130, depending upon the configuration of the ERD 210. The CCM 305 can also receive data via the backhaul to be transmitted to the user devices 105 by the ERD 210.

In an embodiment, the ERD 210 can also receive configuration and management information via the backhaul module 390. For example, in some embodiments, the ERD 210 can be configurable to operate over a wide range of frequencies and use various communications protocols. In some embodiments, the ERD 210 may be configured to a default configuration at the time that the picocell 215 is manufactured or deployed in the field. In some embodiments, the ERD 210 can be configured and/or reconfigured remotely by an administrator at NOC 190. In some embodiments, one or more ERDs 210 included in the picocell 215 can be reconfigured on the fly based on contractual agreements with the carriers and/or based on current or projected demand from user devices within the coverage area of the picocell 215. The ERD 210 can receive power from the power supply module 360 of the ERDSS 215. According to an embodiment, each ERD 210 provides a standard output that can be processed by the ERDSS 215 regardless of the operating configuration of the ERD 210. For example, the ERD 210 can be configured to output IP packets to the ERDSS 215 regardless of the configuration of the ERD 210. This allows the ERDSS 215 to operate with a wide variety of different types of ERD configurations.

According to some embodiments, the backhaul interface can provide both backhaul data and power, and the backhaul module 390 can provide power to the power supply module 360. For example, where the backhaul connection to the ISP network 120 comprises a CATV connection, the CATV connection can provide both data connectivity and power to the ERDSS 215. In embodiments where the backhaul connection provides both data connectivity and power, the backhaul module 390 can be configured to extract the data signal from the backhaul connection and to gate extracted power to the power supply module 360.

Power supply module 360 is configured to supply power to the rest of the ERDSS 215 and can provide power to the ERD 210. The input power supply is highly dependent upon the locality of the CCM 305, and the power supply module 360 can be configured to receive power inputs from various options. For example, the power supply module 360 can be configured to receive 120 or 240 volt AC power available from power lines, or to receive power from a CATV power plant via a cable TV connection, or other power source depending upon the location and usage of the picocell 115. For example, in some embodiments, the picocell 115 can be configured to be a mounted on the messenger strand cable running between utility poles and to connect to a CATV cable for backhaul and power.

In some embodiments, the power supply module 360 can include an uninterruptible power supply (UPS) for providing backup power for a short period of time in the event that the primary power source to the ERDSS 215 fails. In one embodiment, the power supply module 360 can include one or more rechargeable batteries that can be kept charged by the power supply module 360 while the primary power source is available and that can be used as a backup power source if power from the primary power source is interrupted.

Power supply module 360 can also be configured to correct some common problems with power supplied from an external power supply, such as a power surge where a momentary or sustained increase in mains voltage occurs, sag where a momentary or sustained decrease in mains voltage occurs, spikes where brief high voltage transients occur (such as due to lightning strike, short circuits, power transitions in large equipment on the same line, electromagnetic pulses (EMP) and inductive spikes), noise (e.g., high frequency transient or oscillation usually injected into the line by nearby equipment), frequency instability resulting from temporary changes in the mains frequency, or harmonic distortion caused by a departure from the ideal sinusoidal waveform expected on the line. According to an embodiment, the power supply module 360 can be configured to sense the failure of the primary power supply for the ERDSS 215 and to be configured to switch the ERDSS 215 to a secondary power supply, such as a battery backup, and be configured to send a message to NOC 190 indicating that a loss of primary power supply has occurred. Should the primary power supply become available before the secondary power supply has been exhausted, the ERDSS 215 can send a message to NOC 190 indicating that the primary power supply has been restored.

In some embodiments, the ERDSS 215 can periodically ping the NOC 190 or vice versa to confirm that the network links along the backhaul are working and that the ERDSS 215 is responding. If the NOC 190 notes that a ping from the ERDSS 215 has not been received recently or that a ping to the ERDSS 215 has not been successful, a network link investigation process can be initiated in an attempt to determine whether there is a bad link in the network or whether the ERDSS 215 or the picocell 115 is offline ERDSS 215 can also be configured to ping RAN core network 130 to determine if the radio voice and data traffic path is healthy and report the result to NOC 190. If the network connection between ERDSS 215 and NOC 190 is temporarily down, ERDSS can be configured to still continue pinging RAN core network 130 and store the results in its memory 335 and to send the accumulated results back to NOC 190 once network connectivity to NOC 190 is restored.

On/off controller module 399 can be configured to turn on or off components of the ERDSS 215, including powering on or off the ERDSS 215 itself. In an embodiment, on/off controller module 399 can be configured to receive remote instructions from the NOC 190 over the backhaul connection via the backhaul module 390. These instructions can instruct the on/off controller module 399 to power on or off one or more of the ERD 210s, the HCS 375, sensors 370, the ERDSS 215 itself, or other components of the ERDSS 215. In an embodiment, if the ERDSS 215 is configured to power down, the backhaul module 390 and the on/off controller module 399 can be configured to remain powered on to monitor the backhaul connection for instructions from the NOC 190 to power up to ERDSS 215.

Figure 4:
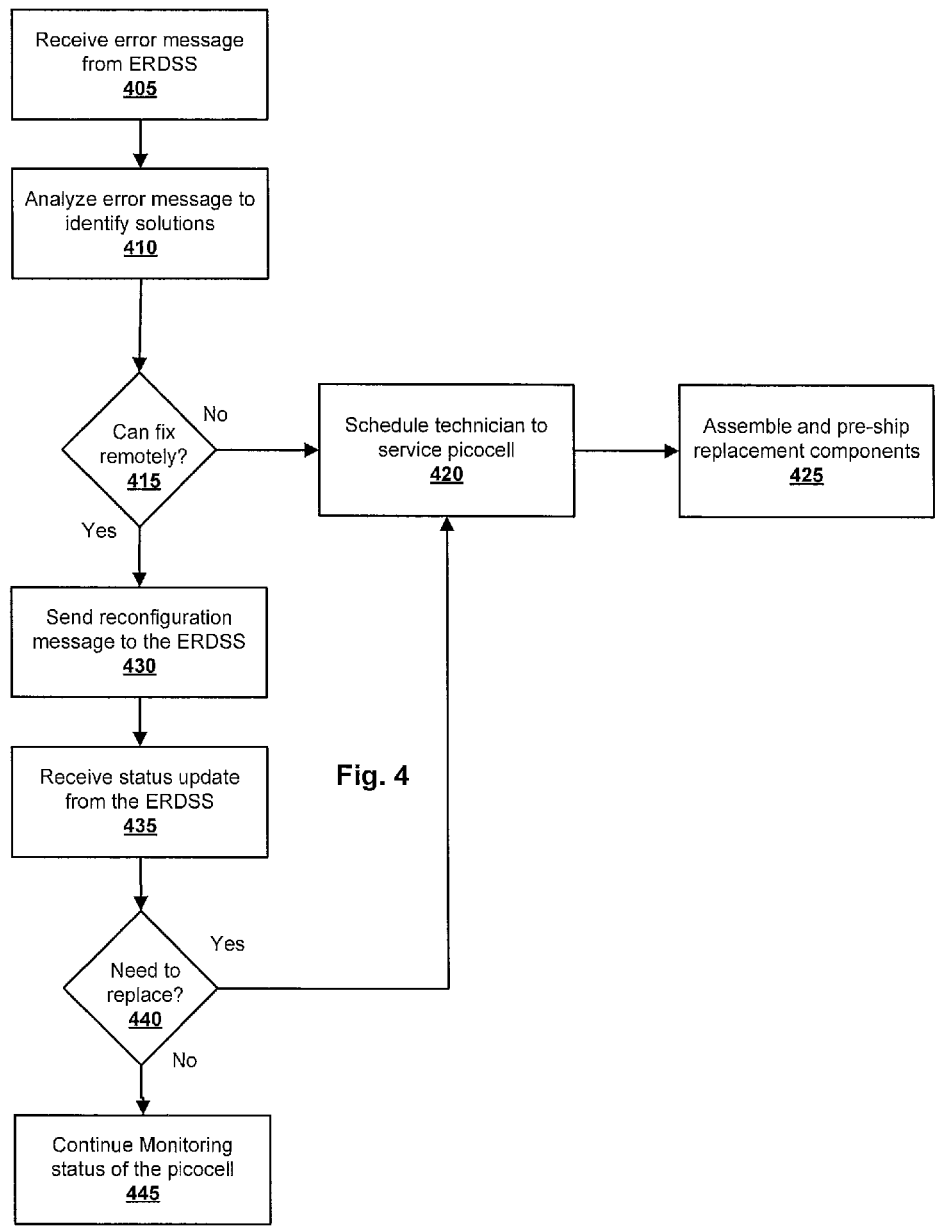
FIG. 4 is a flow diagram of a method for remotely monitoring and diagnosing problems at a picocell according to an embodiment.

FIG. 4 is a flow diagram of a method for remotely monitoring and diagnosing problems at a picocell according to an embodiment. According to an embodiment, the CCM 305 of the ERDSS 215 can be configured to monitor the status of the ERD 210 and the components of the ERDSS 215 and send error messages to the NOC 190 via the backhaul connection if a problem is detected.

The NOC 190 can receive an error message from the ERDSS 215 (step 405) and analyze the error message to try to determine a solution for the problem based on the configuration of the picocell 115 and the problem that has occurred (step 410). For example, if one of a plurality of ERDs 210 has failed, the picocell can determine whether there is another available ERDs 210 that can be configured to replace the faulty ERD 210. In another example, if the bandwidth on the backhaul drops, the computer systems at the NOC 190 can examine the network links to the picocell 115 in an attempt to identify a failure along the network.

A determination is made whether there is a solution to the problem that does not require that a technician be deployed out into the field to the physical location of the picocell (step 415). If there is not a solution that can be implemented without sending a technician into the field, the NOC 190 can schedule a technician to service the picocell (step 420), and order a replacement picocell 115 of the same configuration as the faulty picocell 115, such that it can be assembled and shipped to the technician prior to the technician being deployed to the physical location of the faulty picocell. Due to the modular nature of the picocells, a replacement picocell can be quickly assembled using a similar set of ERDs and including a power supply module 390 configured to operate with the same power supply as the faulty picocell and a backhaul module 360 configured to operate with the same type of backhaul as the faulty picocell.

If there is a solution that can the implemented without sending a technician into the field, the NOC 190 can send a reconfiguration message to the picocell 115 and the ERDSS 215 of the picocell can reconfigure one or more components of the picocell 115 in order to overcome the problems identified by the ERDSS 215. The ERDSS 215 can then send a message to the NOC 190 indicating whether the reconfiguration was successful. The NOC 190 can then receive the status message from the ERDSS 215 (step 435).

A determination is then made whether the picocell 115 needs to be serviced by sending a technician out to replace the device with another similarly configured ERDSS 115 (step 440). If the reconfiguration process was not successful, or even if after reconfiguring the picocell 115, the performance of the picocell may be too degraded to continue operating the picocell without servicing the device. In either of these situations, the NOC 190 can schedule a technician to service the picocell (step 420) and a replacement picocell 115 can be ordered and shipped to the technician for installation (step 425). Otherwise, if reconfiguring the picocell results in the picocell being able to perform at a satisfactory rate, the NOC 190 may continue to monitor the status of the picocell 115, no replacement picocell 115 ordered, and a technician may not need to be scheduled to go out to the location of the picocell.

Figure 5:
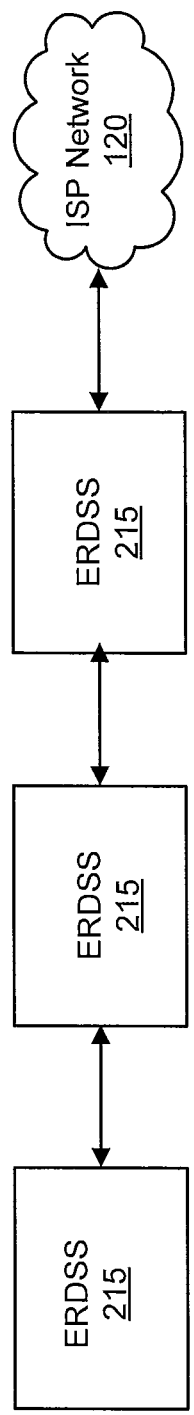
FIG. 5 is a functional block diagram illustrating a plurality of ERDSS configured in a daisy chain configuration according to an embodiment.

FIG. 5 is a block diagram illustrating a plurality of ERDSS 215 configured in a daisy chain configuration according to an embodiment. According to an embodiment, multiple ERDSS 215 can be configured in a cascade or daisy chained configuration that share a single network backbone or backhaul connection and/or power supply. In this configuration, an ERDSS 215 is directly connected to a backhaul connection (similar to the configuration illustrated in FIG. 3). One or more ERDSS 215 can be cascaded from the first ERDSS 215 to allow all of the devices to share a single backhaul connection. The ERDSSs 215 can be configured to be interconnected using various types of physical connections, such as copper wire or optical fiber. In some embodiments, the physical connections between the ERDSSs can carry power from one device to the next, allowing a chain of devices to share a single power source as well as a single backhaul connection. In some embodiments, the backhaul connection can provide both power and data connectivity.

Figure 6:
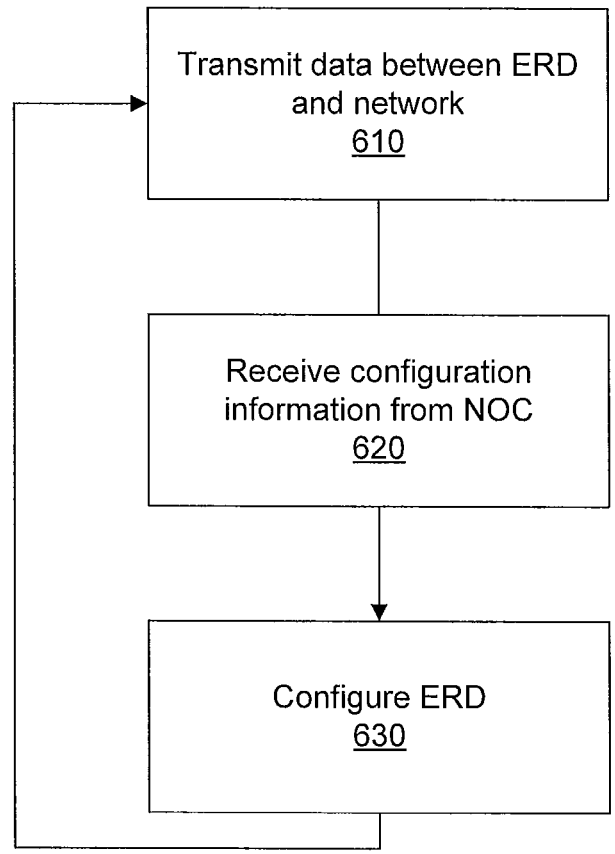
FIG. 6 is a flow diagram illustrating a method of remotely configuring an external radio device according to an embodiment.

FIG. 6 is a flow diagram illustrating a method of remotely configuring an ERD, according to one embodiment. In this embodiment, in block 610, the ERDSS transmits information between one or more ERDs and the ISP network 120 and/or RAN core networks 130. In block 620, the ERDSS may receive configuration information from the NOC 190. The configuration information may be information requesting that one or more of the ERDs be reconfigured. In response, in block 630, the ERDSS may reconfigure one or more ERDs based on the configuration information. The reconfiguration may apply to all or a subset of one or more of the ERDs. The process then flows back to block 610, such that the ERDSS continues to transmit information between the ERD(s), including the reconfigured ERD(s), and the ISP network 120 and/or RAN core networks 130. In an embodiment, the ERDSS may continue to transmit information from and to the ERD(s), possibly including the ERD(s) being configured, during the configuration in blocks 620 and 630.

Though the embodiments described herein are described in terms of a pico cell, they can also be implemented as a macro cell, an enterprise femtocell, a residential femtocell, relays, or any other form of base station or other form of access point, and these terms can be substituted for the term pico cell as used herein.

The systems and methods disclosed herein can be applied to various communication systems. For example, they can be used with Cellular 2G, 3G, 4G (including Long Term Evolution ("LTE"), LTE Advanced, WiMax), WiFi, Ultra Mobile Broadband ("UMB"), and other wireless technologies. Although the phrases and terms used herein to describe specific embodiments can be applied to a particular technology or standard, the systems and methods described herein are not limited to these specific technologies or standards, and are applicable across all technologies and standards.

Those of skill will appreciate that the various illustrative functional blocks, modules, units, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block or step is for ease of description. Specific functions or steps can be moved from one unit, module or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

What is claimed is:

1. A remotely-configurable base station, comprising:
a plurality of radio devices, each of the plurality of radio devices configured to establish one or more wireless links between the base station and one or more user devices using any one of a plurality of frequency bands and any one of a plurality of communication protocols;
one or more sensors configured to capture environmental information;
a heating/cooling system configured to maintain at least one of a temperature and humidity of the base station;
a backhaul module configured to connect to a network using a backhaul connection; and
a common controller module, comprising a first processor, and configured to
direct data between the plurality of radio devices and the network using the backhaul module,
monitor the data communicated between the plurality of radio devices and the network via the backhaul module,
individually activate and deactivate each of the plurality of radio devices,
receive configuration information from a remote network operations center,
based on the configuration information and the information from the monitoring of the data communicated between the plurality of radio devices and the network, individually configure each of the plurality of radio devices to use any one of the plurality of frequency bands and any one of the plurality of communication protocols; and
an on/off controller, comprising, a second processor, and configured to
turn on or off components of the base station, including powering on or off the common controller module while the on/off controller module remains powered, and
receive remote instructions from a network operations center via the backhaul module instructing the on/off controller to power on or off one or more of the components of the base station.

2. A remotely-configurable base station, comprising:
radio devices, each of the radio devices configured to establish one or more wireless links between the base station and one or more user devices;
a backhaul module configured to provide communications to a network;
one or more sensors configured to capture temperature information;
a heating/cooling system;
a common control module comprising a first processor and configured to
transmit data received from the one or more user devices by the radio devices to the backhaul module for communication to the network,
transmit data received from the network by the backhaul module to at least one of the one or more user devices using the radio devices,
monitor the data communicated between the radio devices and the backhaul module,
configure the radio devices based at least in part on information from the monitoring of the data transmitted between the radio devices and the backhaul module,
individually activate and deactivate each of the radio devices,
detect if an activated one of the radio devices is faulty, and, in response to a detection that the activated one of the radio devices has failed, activate a previously inactive one of the radio devices,
receive the temperature information from the one or more sensors, and
control the heating/cooling system to maintain an operating temperature range of the base station based on the temperature information; and
an on/off controller module comprising a second processor and configured to
power down the common control module while the on/off controller module remains powered, and
receive remote instructions from a network operations center via the backhaul module and power down the common control module in response to the received instructions.

3. The base station of claim 2, wherein the common control module is further configured to receive configuration information from a remote network operations center via the backhaul module, and based on the configuration information, reconfigure one or more of the radio devices to use a different communication protocol than it was using prior to the reconfiguration.

4. The base station of claim 3, wherein the common control module is further configured to send a status message to the remote network operations center via the backhaul module, the status message containing information about the status of the radio devices.

5. The base station of claim 2, wherein the radio device support system module further comprises a global positioning system (GPS) module configured to provide location data, and wherein common control module is further configured to self-configure the base station based at least in part on the location data.

6. The base station of claim 2, wherein the common control module is further configured to activate a previously inactive one of the radio devices when the information from the monitoring of the data transmitted between the radio devices and the backhaul module indicates a high utilization period.

7. The base station of claim 2, further comprising
a plurality of antennas;
a radio frequency (RF) front end module coupled to the antennas and the radio devices, the RF front end module configured to combine and split signals sent between the plurality of antennas and the radio devices.

8. The base station of claim 2, wherein the on/off controller is further configured to individually power on or off the radio devices.

9. The base station of claim 8, wherein the on/off controller is further configured to receive instructions via the backhaul module, and power on or off of the radio devices in response to the received instructions.

10. The base station of claim 2, wherein the backhaul module is operable in a plurality of connection types comprising at least two connection types selected from the group consisting of a cable television connection, a data over cable service interface specification connection, a digital subscriber line connection, an asymmetric digital subscriber line connection, a very-high-bit-rate digital subscriber line connection, a digital signal 1 connection, an optical fiber connection, and a satellite connection.

11. The base station of claim 2, wherein the common control module is further configured to provide one or more of synchronization of backhaul traffic, jitter buffering, stack jitter control, and derivation of frequency and timing from traffic flow.

12. The base station of claim 2, wherein the common control module is further configured to assign one or more Internet Protocol addresses to each of the radio devices.

13. The base station of claim 2, wherein the radio device support system module is further configured to be coupled to a second base station to share the backhaul module to provide communications to the network.

\* \* \* \* \*